(12) United States Patent
Joh et al.

(10) Patent No.: US 9,067,170 B2
(45) Date of Patent: Jun. 30, 2015

(54) ABSORBING AGENT, METHOD FOR MANUFACTURING AN ABSORBING AGENT AND USE OF AN ABSORBENT AGENT

(75) Inventors: Ralph Joh, Seligenstadt (DE); Rüdiger Schneider, Eppstein (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1113 days.

(21) Appl. No.: 13/123,757

(22) PCT Filed: Sep. 14, 2009

(86) PCT No.: PCT/EP2009/061860
§ 371 (c)(1),
(2), (4) Date: Sep. 12, 2011

(87) PCT Pub. No.: WO2010/043459
PCT Pub. Date: Apr. 22, 2010

(65) Prior Publication Data
US 2011/0309295 A1 Dec. 22, 2011

(30) Foreign Application Priority Data
Oct. 13, 2008 (EP) ..................... 08017913

(51) Int. Cl.
*B01D 53/14* (2006.01)
(52) U.S. Cl.
CPC ........ *B01D 53/1475* (2013.01); *B01D 53/1493* (2013.01); *B01D 2257/504* (2013.01); *Y02C 10/06* (2013.01); *B01D 2252/20494* (2013.01)

(58) Field of Classification Search
CPC ........................................................ B01D 53/14
USPC ........................................................ 252/184
See application file for complete search history.

(56) References Cited

U.S. PATENT DOCUMENTS

| 4,405,579 A | 9/1983 | Sartori et al. |
| 2012/0051989 A1* | 3/2012 | Wagner et al. ............... 423/210 |

FOREIGN PATENT DOCUMENTS

| DE | 2525780 A1 | 12/1976 |
| EP | 0780370 A2 | 6/1997 |
| GB | 960648 | 6/1964 |
| GB | 960648 A | 6/1964 |
| GB | 1543748 * | 4/1979 |
| RU | 2176240 C2 | 11/2001 |
| WO | WO 2007134994 A2 | 11/2007 |

* cited by examiner

Primary Examiner — John Hardee

(57) ABSTRACT

An absorbent agent is provided. The absorbent agent is particularly for separating carbon dioxide from the flue gas of a fossil-fired combustion device. The absorbent agent comprises a two-component mixture including a free amino acid and an amino acid salt, wherein the free amino acid exhibits a surplus compared to the amino acid salt based on the molar concentration. This creates variability in the PCBN value, which may be attained through different absorption and desorption process temperatures. A method for manufacturing the absorbent agent is also provided.

8 Claims, 1 Drawing Sheet

ABSORBING AGENT, METHOD FOR MANUFACTURING AN ABSORBING AGENT AND USE OF AN ABSORBENT AGENT

CROSS REFERENCE TO RELATED APPLICATIONS

This application is the US National Stage of International Application No. PCT/EP2003/061860, filed Sep. 14, 2009 and claims the benefit thereof. The International Application claims the benefits of European Patent Office application No. 08017913.8 EP filed Oct. 13, 2008. All of the applications are incorporated by reference herein in their entirety.

FIELD OF INVENTION

The invention relates to an absorbing agent, in particular for the selective absorption of carbon dioxide from the flue gas of a combustion plant. The invention further relates to a method for manufacturing an absorbing agent and to a use.

BACKGROUND OF INVENTION

In the context of fossil-fired power plants for generating electrical energy on a large scale, a waste gas containing carbon dioxide is produced as a result of the combustion of a fossil fuel. In addition to carbon dioxide, the waste gas contains further combustion products such as the gases nitrogen, sulfur dioxide, nitrogen oxide and water vapor, for example, as well as solid particles, dusts and soot. After largely separating from the solid-particle components, the waste gas is released into the atmosphere; the carbon dioxide collecting in the atmosphere prevents the radiation of heat from our planet and contributes to an increase in the surface temperature of the earth due to the so-called greenhouse effect.

In order to achieve a reduction in the carbon dioxide emissions in the context of fossil-fired power plants, carbon dioxide can be separated from the waste gas.

Various methods for separating out carbon dioxide from a gas mixture are known, in particular from the chemical industry. In particular, the "absorption-desorption" or low-temperature separation ("cryogenic") method is known for separating out carbon dioxide from a waste gas following a combustion process (post-combustion $CO_2$ separation).

On a large scale, the described separation of carbon dioxide using the absorption-desorption method is effected by means of a washing agent. In a conventional absorption-desorption process, the waste gas is brought into contact with a selective solvent as a washing agent in an absorption column, and the absorption of carbon dioxide is effected by a chemical or physical process in this case.

The carbon-dioxide-loaded solvent is carried to a desorption column for the purpose of separating out the carbon dioxide and regenerating the solvent, wherein the separation in the desorption column can take place thermally. In this case, a gas-vapor mixture of gaseous carbon dioxide and vaporized solvent is driven out of the loaded solvent. The vaporized solvent is then separated from the gaseous carbon dioxide. The carbon dioxide can now be condensed, cooled and liquefied in a plurality of stages. In liquid or frozen state, the carbon dioxide can then be supplied to a storage or recycling facility. The regenerated solvent is fed back to the absorption column, where it can absorb carbon dioxide from the carbon-dioxide-bearing waste gas again.

A central problem in the existing method for separating out carbon dioxide from a gas mixture is in particular the very high energy expenditure that is required in the form of heat energy for the desorption. In order to counter this problem, a range of proposals are known from the prior art.

In the context of gas washing in the chemical industry, use is often made of physical washing agents. In the case of $CO_2$ separation using physical washing agents, comparatively limited capacities and selectivities of the absorbing agent must nonetheless be accepted as disadvantages. As a result of this, physical washes are only considered in the case of comparatively high partial pressures, and are therefore ruled out for the post-combustion capture processes. In the case of what are known as chemical washing agents, a significantly higher loading of the absorbing agent with carbon dioxide can be achieved due to the chemical reactions involved. In this case, the acidic gas carbon dioxide is bonded with a base. Amino compounds are examples of base reaction partners. The basicity or the base strength value (pKb value) has a crucial role in the $CO_2$ capacity and the desorption energy in this case. The higher the pKb value, the further the reaction balance lies on the side of the resulting carbamates and bicarbonates/hydrogen carbonates. As a consequence, however, there is also a stronger bond and hence a higher reaction enthalpy that must be applied again for the desorption. Until now, it has always been necessary to accept the result of the these opposing effects as unavoidable and that therefore, in particular in the case of the reactive washing agents or solvents, a high energy input was required for the desorption process in the desorption column, this being at the expense of the overall efficiency of the power plant.

SUMMARY OF INVENTION

The invention therefore addresses the problem of specifying an absorbing agent which exhibits a significantly better energetic balance in comparison with the previously known absorption agents. The invention also addresses the problem of specifying a manufacturing method for manufacturing the absorbing agent. Furthermore, the invention addresses the problem of specifying a use.

The problem relating to an absorbing agent is solved in accordance with the invention by an absorbing agent, in particular for the selective absorption of carbon dioxide from the flue gas of a combustion plant, containing a mixture of a concurrently present amino acid salt and a free amino acid.

In this case, the invention takes as its starting point the insight that one class of amino compounds promising particular success for the absorption of carbon dioxide comprises those amino acids which are converted into the corresponding amino acid salt with an equimolar amount of anorganic base (usually potassium hydroxide KOH). Amino acids, or more precisely aminoalkanoic acids, are a class of small organic compounds comprising at least one carboxyl group (—COOH) and at least one amino group (—$NH_2$). In organic chemistry, the amino group is understood to be the functional group (—$NH_2$) of the primary amines and amino acids. The amino group is a basic functional group, since the free electron pair at the nitrogen atom (like that in the ammonia molecule) can accept a proton from an acid. In aqueous solution, amino acids are present as so-called zwitterions, i.e. the amino group is protonated and the carboxyl group is deprotonated. In this case, the amino group acts as a base, since it accepts a proton (proton acceptor). The carboxyl group acts as an acid, since it donates a proton (proton donator). The present invention also makes use of this particular property of the amino acids.

A free amino acid, i.e. one that is not mixed with potassium hydroxide, can function both as an acid and as a base, and has a variable pKb value. The present invention takes advantage of the fact that the pKb value is temperature-dependent in the case of amino acids. Therefore, if free amino acid is also present in the absorbing agent in addition to the (pure) amino acid salt used previously, a variation of the pKb value of the absorbing agent is achieved as a result of the temperature difference between absorber and desorber, wherein a higher pKb value is achieved in the cold absorber, this favoring the absorption, and a lower pKb value is obtained in the hot desorber, whereby less energy is required for the desorption. As a result of the concurrent mixture of amino acid salt and a free amino acid, it is possible to adjust the pKb value by means of temperature variation, wherein specific use is made of the effect that, in the case of exothermic dissolving processes, the solubility decreases as the temperature increases.

In a particularly preferred embodiment of the absorbing agent, this contains a non-equimolar mixture of the amino acid salt and the free amino acid. In this case, there is a surplus of free amino acid in the mixture relative to the concentration of the amino acid salt. Furthermore, the mixture is preferably present in aqueous solution.

In a preferred embodiment of the absorbing agent, this exhibits a decreasing base strength (pKb value) as the temperature increases.

In the case of a particularly preferred embodiment, the amino acid salt features a substituent, wherein the substituent is a compound from the group of hydrogen, alkyl, hydroxyalkyl or aminoalkyl.

The amino acid salt preferably features a further substituent, wherein the further substituent is taken from the group of hydrogen, alkyl, hydroxyalkyl or halogenalkyl.

In a further preferred embodiment, the absorbing agent is characterized in that the amino acid salt is a salt of a metal, in particular a salt of an alkaline metal with an element from the group potassium or sodium, wherein the hydrogen is replaced by the metal in the amino acid salt in the carboxyl group.

In a further preferred embodiment of the absorbing agent, the amino acid features further substituents, wherein the further substituent is taken from the group of hydrogen, alkyl, hydroxyalkyl or halogenalkyl.

The usable amino acids according to the invention can therefore be described as having a generally applicable form. In this case, the above cited substituents of the amino acid salt and the amino acid are not necessarily identical when a further amino acid is added in the case of the amino acid salt and the free amino acid, i.e. in a specific absorbing agent, the amino acid salt and the amino acid in surplus can be present with different substituents in each case. By embodying the absorption agent as a mixture of an amino acid salt and a free amino acid, these preferably being present in aqueous solution, provision is made for the first time for an absorbing agent which can be used particularly advantageously in an absorption-desorption process for the separation of carbon dioxide from the flue gas of a combustion plant. According to the invention, a particularly beneficial energetic balance of the overall cleaning process is established in the absorption and desorption regions.

The problem relating to a method for manufacturing an absorbing agent is solved according to the invention in that, by means of equimolar addition of a lye to an amino acid, the amino acid is completely converted into an amino acid salt, and by means of a further addition of an amino acid, a mixture of amino acid salt and free amino acid is created, such that amino acid salt and free amino acid are present concurrently.

The method is preferably carried out in aqueous solution, creating an aqueous solution in which amino acid salt and a free amino acid in surplus are both present concurrently.

Instead of completely converting the amino acid into the amino acid salt by means of equimolar addition of lye, it is also possible to create a mixture of amino acid salt and free amino acid by adding a smaller amount of lye. A further possibility is the addition of an additional amino acid to an already existing equimolar mixture. By virtue of the concurrent presence of amino acid salt and free amino acid, a variable pKb value is achieved which favors the absorption of carbon dioxide at low temperature and improves the desorption at high temperature.

The problem addressed by the invention and relating to a use is solved by a use of an absorbing agent comprising a mixture of a concurrently present amino acid salt and a free amino acid for the absorption of carbon dioxide from the flue gas of a combustion plant.

During the use, the absorbing agent is preferably brought into contact with carbon-dioxide-bearing waste gas first, such that carbon dioxide is dissolved in the absorbing agent, thereby forming a loaded absorbing agent, and carbon dioxide is then thermally desorbed from the loaded absorbing agent.

In a particularly preferred embodiment of the use, said use is performed at a lower temperature during the absorption of carbon dioxide from the flue gas by the absorbing agent than the desorption. By virtue of this particularly advantageous embodiment of the use, exploitation of the temperature-dependent pKb values of the absorbing agent in the absorption and desorption process allows a particularly favorable energy balance to be achieved overall, such that a comparatively high degree of efficiency can be achieved when a carbon-dioxide separation apparatus is integrated into a power plant.

In a particularly preferred embodiment of the use, said use is applied in the context of absorption of carbon dioxide from the flue gas of a fossil-fired steam power plant, from the waste gas of a gas turbine plant or from the waste gas of a combined gas and steam turbine plant or an IGCC plant.

BRIEF DESCRIPTION OF THE DRAWINGS

Exemplary embodiments of the invention are explained in greater detail below with reference to the appended drawing, in which.

DETAILED DESCRIPTION OF INVENTION

Figure 1:
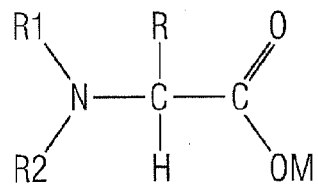
FIG. 1 shows a generally applicable formulation of the amino acid salt as a component in the mixture of the absorbing agent according to the invention.

FIG. 1 illustrates an amino acid salt which has substituents R, R1 and R2. The substituent R is a compound from the group of hydrogen, alkyl, hydroxyalkyl or aminoalkyl. The further substituents R1, R2 are taken from the group of hydrogen, alkyl, hydroxyalkyl or halogenalkyl. The amino acid salt is a salt of a metal M, in particular a salt of an alkaline metal with an element from the group potassium or sodium, wherein the hydrogen H is replaced by the metal M in the amino acid salt in the carboxyl group.

Figure 2:
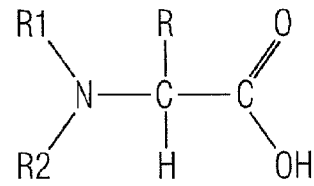
FIG. 2 shows a generally applicable formulation of the free amino acid as a further component in the mixture for the absorbing agent according to the invention.

Using chemical nomenclature, FIG. 2 represents a free amino acid as it is used as a second component of the mixture for the absorbing agent. The amino acid has a carboxyl group —COOH and at least one amino group —$NH_2$. The free amino acid has a substituent R, wherein the substituent R is a compound from the group of hydrogen, alkyl, hydroxyalkyl or aminoalkyl.

The free amino acid has further substituents R1, R2, wherein the further substituent R1, R2 is taken from the group of hydrogen, alkyl, hydroxyalkyl or halogenalkyl.

Manufacture of the absorbing agent can be done by firstly completely converting amino acid into an amino acid salt by means of equimolar addition of a lye, e.g. potassium hydroxide. In a further step, by means of further addition of an amino acid, a mixture of amino acid salt and free amino acid is manufactured, such that amino acid salt and free amino acid are present concurrently. As an alternative to the equimolar addition of lye and the complete conversion into the amino acid salt, it is also possible to manufacture a mixture of amino acid salt and free amino acid by means of a smaller addition of lye. A further possibility is the addition of an additional amino acid. As a result of this non-equimolar mixture of amino acid salt and free amino acid, a variable pKb value is achieved, whose thermal behavior favors the absorption of $CO_2$ at low temperature and clearly improves the desorption at high temperature in terms of energy.

Figure 3:
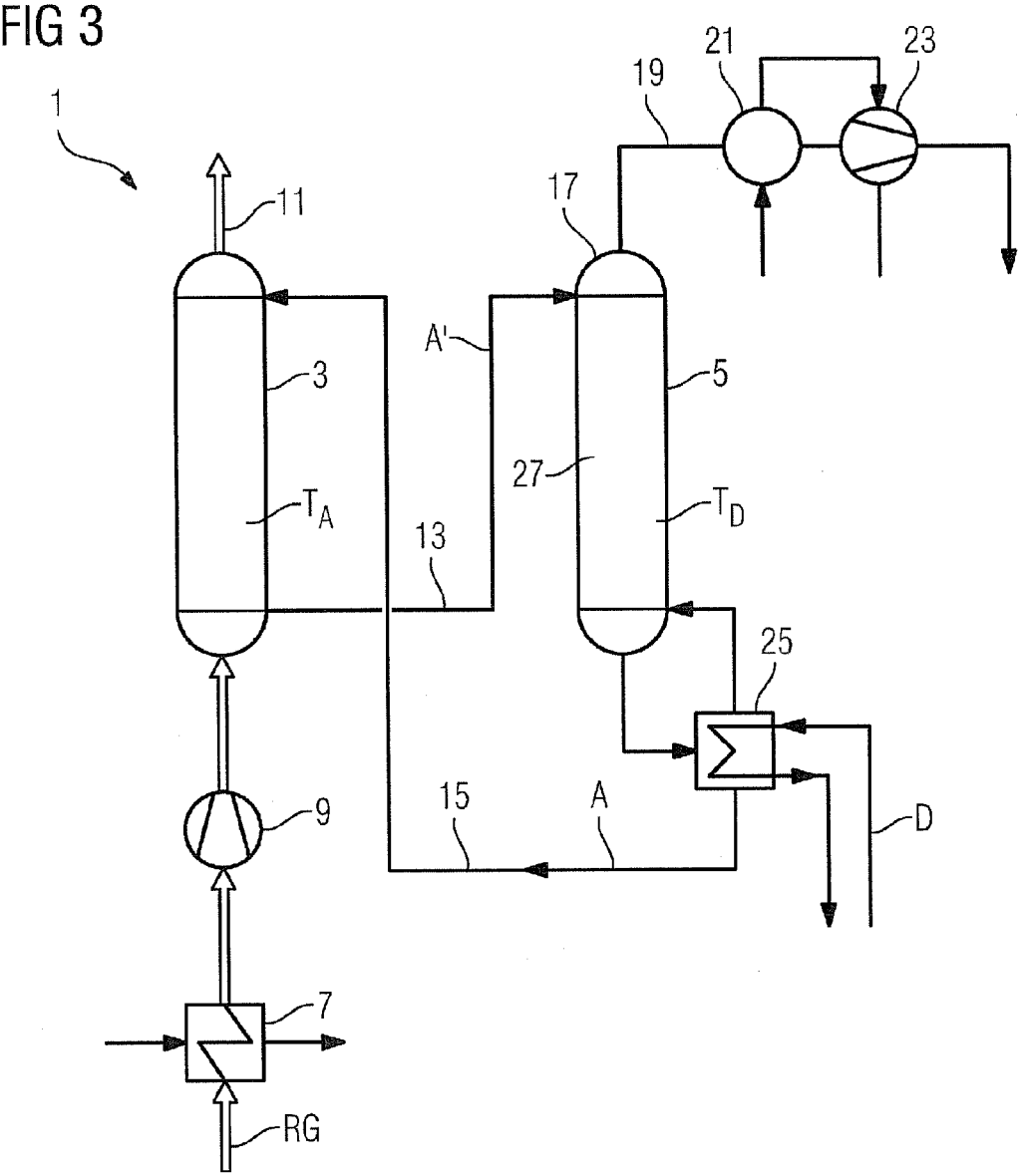
FIG. 3 shows a schematic illustration of a separation apparatus for carbon dioxide from the flue gas of a combustion plant.

FIG. 3 shows a functional block diagram of a separation apparatus 1 as a schematic illustration. The separation apparatus 1 features an absorption device 3 and a desorption device 5 which is assigned to the absorption device. A reboiler 25, to which a process vapor D can be supplied during operation for the purpose of providing heat, is assigned to the desorption device 5. The desorption device 5 has a header region 17 of the desorber, to which a gas line 19 for $CO_2$-rich gas is connected. Provision is made in the gas line 19 for a heat exchanger 21 and exchanger 80 after compressor unit 23 for compressing the carbon dioxide or carbon-dioxide-rich gas. The absorption device 3 is connected to the desorption device 5 via a line 13. The desorption apparatus 5 is connected to the absorption device 3 via a line 15 via the reboiler 25.

During operation of the separation apparatus 1, flue gas RG from a fossil-fired combustion plant (not shown in detail in FIG. 3) is first cooled in a flue gas cooler 7 and then supplied to the absorption device 3 via the transport device 9. In accordance with the counterflow principle, a regenerated absorbing agent A is carried into the absorption device 3 in the opposite direction to the flue gas flow RG. As part of this activity, the regenerated absorbing agent A is carried via the line 15 which connects the flow from the reboiler 25 to the absorption device 3. In this way, absorbing agent A which is regenerated in the reboiler 25 can be supplied to the absorption device 3. The absorbing agent comprises a mixture of an amino acid salt and a free amino acid in an aqueous solution, such that a basicity is achieved at an absorption temperature $T_A$ in the absorption process, such that a correspondingly high solubility of the carbon dioxide from the flue gas RG is achieved in the absorbing agent A. By virtue of the concurrent presence of amino acid salt and free amino acid, a variable pKb value is achieved which favors the absorption of carbon dioxide at low temperature $T_A$ in the absorption device 3 and improves the desorption at high temperature $T_D$ in the desorption device 5. According to the invention, use is made of the effect that the solubility decreases as the temperature increases in the case of exothermal dissolving processes. The inventive absorbing agent A, comprising a mixture of amino acid salt and free amino acid, is especially formulated and suitable for this absorption-desorption process, such that a high degree of efficiency is achieved when the separation apparatus 1 is integrated into a power plant. In this case, the separation efficiency is clearly improved in comparison with the conventional absorption agents. The waste gas 11, which is largely liberated of carbon dioxide, leaves the absorber device through a chimney (not shown in detail).

As a result of the absorption processes using the absorbing agent A in the absorption device 3, the absorbing agent A becomes loaded with carbon dioxide $CO_2$, thereby forming a loaded absorbing agent A'. The loaded absorbing agent A' is carried via the line 13 from the absorption device 3 to the desorption device 5. In the desorption device 5, the carbon-dioxide-loaded absorbing agent A' is liberated of carbon dioxide again. This desorption is usually effected by thermally driving out the carbon dioxide from the absorbing agent A'. In the header region 17 of the desorption device 5, carbon-dioxide-rich gas is first drawn off from the desorption device 5 via the gas line 19 and carried via a heat exchanger 21 and a compressor 23 that is connect to the heat exchanger 21. The thus separated carbon dioxide is compressed in the compressor 23 and used for other purposes, e.g. injection into an aquifer or another type of $CO_2$ store.

The desorption process in the desorption device 5 takes place at a desorption temperature $T_D$ which is higher than the absorption temperature $T_A$. By means of the inventive absorbing agent A, a variable pKb value is achieved which varies with the temperature of the process, such that the pKb value in the region of the absorption is higher than in the region of the desorption. In this way, the absorption is favored and a lower pKb value is produced in the hotter desorber, whereby less desorption energy is required for the desorption. The carbon dioxide can therefore be driven out of the loaded absorbing agent A' using a significantly lower energy input.

The illustrated separation apparatus 1 with the inventive absorbing agent A is particularly suitable for use in a power plant, e.g. a steam power plant, a gas turbine plant, a combined gas and steam turbine plant, or in a gas and steam turbine plant with integrated coal gasification. On the path to developing a $CO_2$-free power plant, the invention here shows, in the choice of the absorbing agent, a means by which the absorption-desorption process can be integrated efficiently into an existing power plant process. This is also particularly advantageous with regard to power plant modernization and upgrades, wherein a conventional power plant which is adversely affected by $CO_2$ emissions can be equipped or converted in a particularly environmentally friendly manner by the additional installation of a separation apparatus for carbon dioxide.

The invention claimed is:

1. A method for manufacturing an absorbing agent for the selective absorption of carbon dioxide from a flue gas of a combustion plant, comprising:
    completely converting an amino acid into an amino acid salt by an equimolar addition of a lye; and
    producing a mixture of amino acid salt and free amino acid by further addition of an amino acid which includes a different substituent than the amino acid salt, such that the amino acid salt and the free amino acid are present concurrently.

2. The method as claimed in claim 1, wherein the method is carried out in an aqueous solution.

3. The method as claimed in claim 1,
    wherein for the selective absorption of carbon dioxide from the flue gas of the combustion plant, an absorbing agent is first brought into contact with carbon-dioxide-bearing waste gas, such that carbon dioxide is dissolved in the absorbing agent, thereby forming a loaded absorbing agent, and
    wherein carbon dioxide is then thermally desorbed from the loaded absorbing agent.

4. The method as claimed in claim 3,
wherein the absorption of carbon dioxide from the flue gas using the absorbing agent takes place at a lower temperature than the desorption.

5. A method for manufacturing an absorbing agent for the selective absorption of carbon dioxide from a flue gas of a combustion plant, comprising:
completely converting an amino acid into an amino acid salt by an addition of a lye; and
producing a mixture of amino acid salt and free amino acid by further addition of an amino acid which includes a different substituent than the amino acid salt, such that the amino acid salt and the free amino acid are present concurrently.

6. The method as claimed in claim 5, wherein the method is carried out in an aqueous solution.

7. The method as claimed in claim 5,
wherein for the selective absorption of carbon dioxide from the flue gas of the combustion plant, an absorbing agent is first brought into contact with carbon-dioxide-bearing waste gas, such that carbon dioxide is dissolved in the absorbing agent, thereby forming a loaded absorbing agent, and
wherein carbon dioxide is then thermally desorbed from the loaded absorbing agent.

8. The method as claimed in claim 7,
wherein the absorption of carbon dioxide from the flue gas using the absorbing agent takes place at a lower temperature than the desorption.

* * * * *